United States Patent
Fichou et al.

(10) Patent No.: US 7,400,635 B2
(45) Date of Patent: *Jul. 15, 2008

(54) METHOD AND SYSTEM FOR ASSEMBLING SEGMENTED FRAMES OF DATA TRANSMITTED OVER A BACKBONE NETWORK

(75) Inventors: Aline Fichou, La Colle sur Loup (FR); Claude Galand, La Colle sur Loup (FR); Jacques Fieschi, St Laurent du Var (FR); Jean-Francoise Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 702 days.

This patent is subject to a terminal disclaimer.

(21) Appl. No.: 11/030,298

(22) Filed: Jan. 7, 2005

(65) Prior Publication Data

US 2005/0117577 A1    Jun. 2, 2005

Related U.S. Application Data

(63) Continuation of application No. 09/512,562, filed on Feb. 24, 2000, now Pat. No. 6,870,850.

(30) Foreign Application Priority Data

Feb. 26, 1999    (EP) ................... 99480007

(51) Int. Cl.
*H04L 12/28* (2006.01)
*H04L 12/56* (2006.01)

(52) U.S. Cl. .................... 370/400; 370/474

(58) Field of Classification Search ............ 370/389, 370/392, 400, 401, 428, 429, 465, 466, 470, 370/471, 476, 320, 342, 474, 412, 395.52–395.6, 370/535, 539, 541
See application file for complete search history.

(56) References Cited

U.S. PATENT DOCUMENTS 5,425,023 A  *  6/1995  Haraguchi et al. .......... 370/400

(Continued)

*Primary Examiner*—Ajit G Patel
(74) *Attorney, Agent, or Firm*—John Pivnichny; Greenblum & Bernstein P.L.C.

(57) ABSTRACT

A method and system of transmitting data frames from a sending unit (10) to a receiving unit (12) in a data transmission network comprising at least a backbone (14) wherein the data are transmitted over high speed links enabling long Maximum Transmission Units (MTU) between an ingress node (18) connected to the sending unit by a first access link (16) and an egress node (22) connected to the receiving node by a second access link (20), with at least one of the first and second access links being a low speed access link requiring the data frames to be segmented into short MTUs between the sending unit and the ingress node and between the egress node and the receiving unit. A plurality of consecutive segmented data frames (28) belonging to the same flow of data transmitted from the sending unit to the ingress node are assembled by the ingress node into an assembled data frame (30) corresponding to the long MTU, the assembled data frame is transmitted over the backbone from the ingress node to the egress node at a high speed authorized by the backbone links, and the assembled data frame is de-assembled into consecutive segmented data frames (32) corresponding to the short MTUs by the egress node before being transmitted to the receiving unit.

13 Claims, 10 Drawing Sheets

U.S. PATENT DOCUMENTS

| | | |
|---|---|---|
| 5,550,978 A | 8/1996 | Takahashi et al. |
| 5,696,761 A | 12/1997 | Kos et al. |
| 5,751,970 A * | 5/1998 | Bournas .................... 709/236 |
| 5,956,344 A | 9/1999 | Cole |
| 6,201,813 B1 | 3/2001 | Klausmeier et al. |
| 6,212,190 B1 * | 4/2001 | Mulligan .................... 370/400 |
| 6,430,201 B1 | 8/2002 | Azizoglu et al. |
| 6,483,854 B1 | 11/2002 | Klausmeier et al. |
| 2004/0003126 A1 * | 1/2004 | Boucher et al. ............. 709/250 |
| 2004/0148382 A1 * | 7/2004 | Narad et al. ................ 709/223 |
| 2005/0278459 A1 * | 12/2005 | Boucher et al. ............. 709/250 |

\* cited by examiner

METHOD AND SYSTEM FOR ASSEMBLING SEGMENTED FRAMES OF DATA TRANSMITTED OVER A BACKBONE NETWORK

CROSS REFERENCE TO RELATED APPLICATIONS

This application is a continuation application of U.S. patent application Ser. No. 09/512,562, Feb. 24, 2000 now U.S. Pat. No. 6,870,850 which is now incorporated herein by reference.

FIELD OF THE INVENTION

The present invention relates to data transmission networks wherein data frames are fragmented by a source node before being transmitted to a destination node, and relates particularly to a method and a system for assembling segmented frames of data transmitted over a backbone.

BACKGROUND OF THE INVENTION

The use of data transmission networks based upon packet switching becomes more and more important today for transmitting data within a delimited area such as a firm, a plant, a building, etc. through Local Area Networks (LANs) as for transmitting data over long distances by using Wide Area Networks (WANs).

In such a network, when one host has a large amount of data to send to another host, the data are transmitted as a series of datagrams or packets. It is usually preferable that these datagrams be of the largest size that can successfully traverse the path from the source node to the destination node without requiring being fragmented anywhere along the path. This datagram size is referred to as the path Maximum Transmission Unit (MTU) and is equal to the minimum link MTU of all the links in the path. Although there are several techniques for dynamically discovering this path MTU, the current practice is to use the first hop MTU when the first hop is a low speed link like a remote access where generally a MTU value of 576 bytes is used.

The fragmentation of the frames meeting the MTU, required by the low transmission speed on some links of the path, presents some advantages. Thus, in the data transmission systems with acknowledgments, such as TCP/IP systems, the transmission of short frames enables them to be presented (generally displayed) early in time to the user. Furthermore, long frames are not well or not all supported by some switching or routing equipment, or even certain applications, when a low speed link in the remote access results in long transmission delays.

When there are both data and voice transmission on the same path, the voice frames are generally short and do not enable a too important jitter which is produced for example when a long data frame is transmitted between two voice frames. Therefore, the frame size must be reduced to obtain an acceptable jitter to avoid using a too important destination jitter buffer leading to a too long transmission delay incompatible with the requirements of the voice transmission.

But the transmission of short frames also presents a number of drawbacks. Thus, the data processing in a node becomes more complex insofar as for a given quantity of transmitted data, the number of frames which are stored and processed is increased. Furthermore, the number of frames that a node can process in a given time is limited insofar as there is an incompressible processing time and a buffer is required for each frame. For example, with an usual MTU of 576 bytes, buffers of 1 Kbytes are necessary since buffers of 512 bytes are not sufficient, and buffering is not optimized. Another drawback which is not the least is that the use of short frames requires important headers with respect to the data which results in an overhead that can represent 10% of the data.

SUMMARY OF THE INVENTION

Accordingly, one purpose of the invention is to achieve a method of assembling segmented frames into long frames in any subnetwork of a data transmission network such as a backbone wherein the links enable the data to be transmitted at high speed.

The invention relates therefore to a method of transmitting data frames from a sending unit to a receiving unit in a data transmission network comprising at least a backbone wherein the data are transmitted over high speed links enabling long Maximum Transmission Units (MTU) between an ingress node connected to the sending unit by a first access link and an egress node connected to the receiving node by a second access link, with at least one of the first and second access links being a low speed access link requiring the data frames to be segmented into short MTUs between the sending unit and the ingress node and between the egress node and the receiving unit. When received by the ingress node, a plurality of consecutive segmented data frames belonging to the same flow of data transmitted from the sending unit to the ingress node are assembled into an assembled data frame corresponding to the long MTU, the assembled data frame is transmitted over the backbone from the ingress node to the egress node at a high speed authorized by the backbone links, and the assembled data frame is de-assembled into consecutive segmented data frames corresponding to the short MTUs by the egress node before being transmitted to the receiving unit.

According to the invention, the assembled data frame includes a plurality of assembled parts wherein each assembled part is composed of a data field containing the data of the corresponding frame of the plurality of consecutive segmented data frames and of an assembly header containing at least the length of the assembled part, the plurality of assembled parts being preceded by a main protocol header containing the same protocol information as the protocol headers of the segmented data frames and new information relating to the assembled part.

According to another aspect, the invention relates to a data transmission system for transmitting data frames from a sending unit to a receiving unit and comprising at least a backbone wherein the data are transmitted over high speed links enabling long Maximum Transmission Units (MTU) between an ingress node connected to the sending unit by a first access link and an egress node connected to the receiving node by a second access link, with at least one of the first and second access links being a low speed access link requiring the data frames to be segmented into short MTUs between the sending unit and the ingress node and between the egress node and the receiving unit, the ingress node comprising means for assembling a plurality of consecutive segmented data frames belonging to the same flow of data transmitted from the sending unit to the ingress node into an assembled data frame corresponding to the long MTU.

BRIEF DESCRIPTION OF THE DRAWINGS

The above and other objects, features and advantages of the invention will be better understood by reading the following more particular description of the invention presented in conjunction with the accompanying drawings wherein.

DESCRIPTION OF PREFERRED EMBODIMENTS

Figure 1:
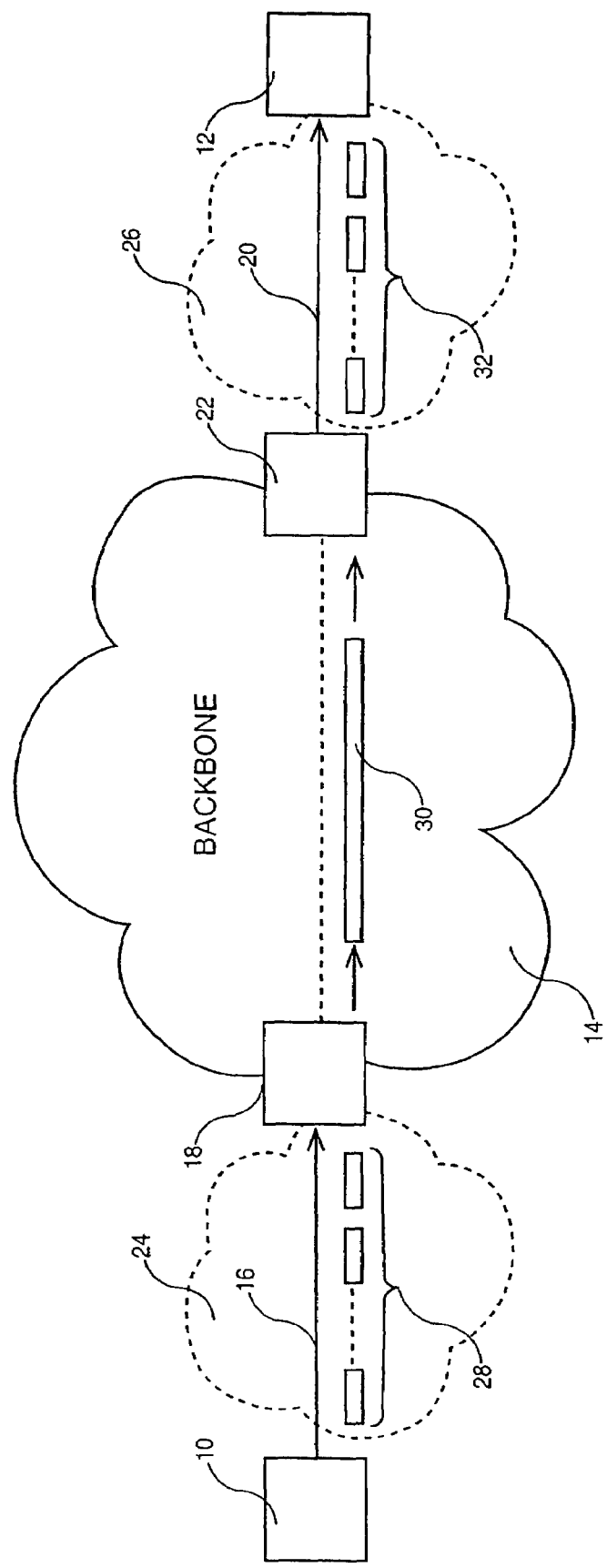
FIG. 1 represents schematically a data transmission system including a backbone authorizing a high speed transmission, wherein the method according to the invention can be implemented.

FIG. 1 is a schematic representation of a data transmission from a sending unit 10 to a receiving unit 12, both units being generally data transmission equipment (DTE). The transmission path between sending unit 10 and receiving unit 12 includes a backbone 14 such as the Internet network having links authorizing a high speed transmission whereas the network outside backbone 14 includes links authorizing only low speed transmission. Thus, the link 16 between sending unit 10 and ingress node 18 of the backbone and the link 20 between egress node 22 of the backbone and receiving unit 12 are generally low speed lines. Note that sending unit 10 could be connected to backbone 14 by another Network 24 represented by dashed lines such as a Local Area Network (LAN) or a Wide Area Network (WAN) supporting a lower MTU than the backbone. Likewise, egress node 22 could be connected to receiving unit 12 by another LAN or WAN 26 such as Ethernet-also represented by dashed lines.

As illustrated in FIG. 1, the flow of data between sending unit 10 and ingress node 18 is segmented into frames 28 corresponding to short Maximum Transmission Units (MTU). Then, data frames 28 are assembled by ingress node 18 into an assembled data frame 30 corresponding to a long MTU compatible with the high speed transmission within backbone 14. Data frame 30 is then de-assembled by egress node 22 into short data frames before being transmitted to receiving unit 12.

Figure 2A:
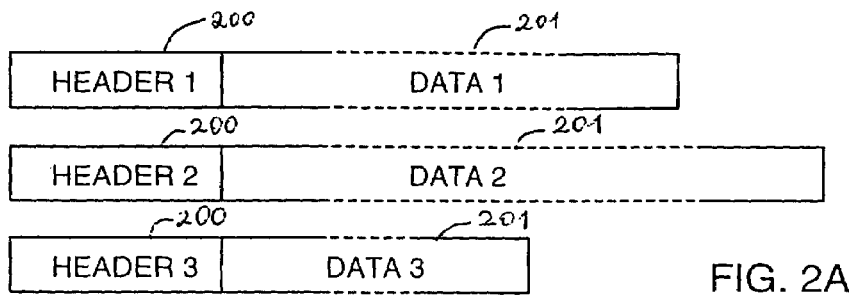
FIGS. 2A and 2B represent respectively three consecutive segmented frames received by the ingress node of the backbone and the assembled data frame resulting from the assembly of the three frames.

It is assumed that the three consecutive data frames for the same flow of data illustrated in FIG. 2A are received by ingress node 18. Each frame is composed of a header field (200) and a data field (201). The header fields of the three frames are of the same type, such as of the IP/TCP type including an IP header followed by a TCP header.

Figure 2B:
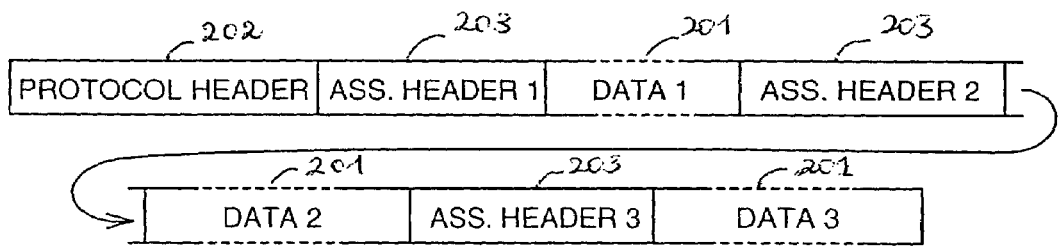

As illustrated in FIG. 2B, the mechanism implementing the method of the invention in ingress node 18, assembles the three frames into a single frame. This frame includes a main protocol header (202) and three assembled parts containing the data fields (201) of the frames illustrated in FIG. 2A, each data field being preceded by an assembly header (203).

The main protocol header of the assembled data frame illustrated in FIG. 2B looks like the header of each frame illustrated in FIG. 2A. It may include one or several levels of protocols depending on the flow characteristics. For example, an IP/TCP/FTP flow may use a common IP/TCP header and put the FTP field in data. For some flows, the main protocol header may be reduced to a single protocol layer such as IP or SNA. The main protocol header of the assembled data frame is similar to the header of the first frame but with six changes. The first change is on the frame length (if any) which should be changed to the value that takes into account all the frames appended in the assembled frame. The second change is on the checksum or CRC (if any) which should be changed to the value that takes into account all the frames appended in the assembled frame. A third change, if required, applies to a data pointer defining the beginning of data which should be set to the first assembly header. As a fourth change, the sequence numbers NS/NR for transmit and receive and ACK number (if any) should either be included in each assembly header or, if continuous and ordered, only the first pair of values (or the last) may be set insofar as the correct values can be re-built by the egress node. The fifth change is not always implemented. As a matter of fact, if a window field exists and is identical for all the frames, it can be let unchanged. Otherwise, the window field should be included in each assembly header. As the sixth change, similarly to the fifth change, the value of any field of the headers in the consecutive frames which is different from the corresponding field of the header in the first frame, is to be put in the corresponding assembly header.

Each assembly header of the assembled data frame of the preferred embodiment comprises a length field (for example, 12 bits), a control field of 4 bits, an optional checksum field (of 16 or 32 bits) and an optional differential header field that may use either a differential template by protocol or a general purpose differential header. The control field of 4 bits includes one bit reserved, one bit to indicate the last data field, one bit to indicate an additional checksum field (may be used to speed up the transmission when de-assembling allowing to avoid waiting for the global CRC checking), and one bit to indicate that a differential header is provided; this last bit is useful when the sequence number field, the window field or any other field is different or unordered. The general purpose differential header includes four sub-fields. The first sub-field is a position sub-field giving the position of the first byte different from the protocol header of the assembled frame. The second sub-field is one length sub-field giving the number of consecutive bytes different from the corresponding bytes of the main protocol header of the assembled frame. The third sub-field comprises all the consecutive different bytes identified by the previous sub-fields. The last sub-field indicates that the begins at the next position.

Figure 3:
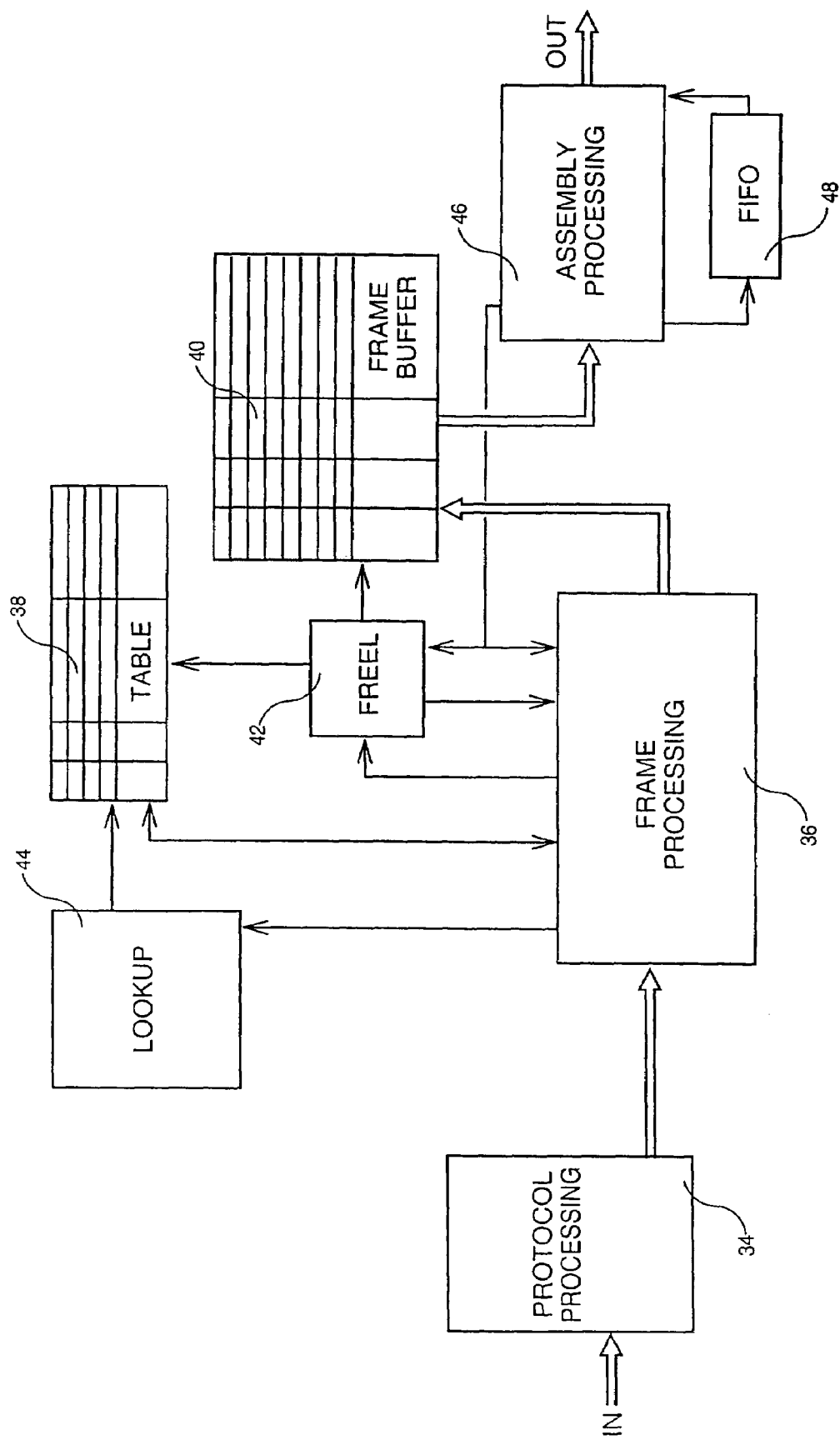
FIG. 3 is a block-diagram of the assembling mechanism of the ingress node used to implement the method according to the invention.

The mechanism used by the ingress node to implement the method of the invention is represented in FIG. 3. Data frames corresponding to a short MTU required by at least a low speed link are received in Protocol Processing unit 34 wherein they are identified (for example TCP/IP) and processed. For protocols that are identified, the frames are sent to Frame Processing unit 36 which controls the storage of various information elements in a Table 38 and a Frame buffer 40 useful to build the assembled data frame illustrated in FIG. 2A and also controls a list of pointers FREEL 42 storing the free locations of Frame Buffer 40 to be used in the assembling method. Note that Frame Processing unit 36 could be either a finite state machine or a program.

In order to identify each flow of data, Frame Processing Unit 36 requests for each frame an address lookup of Table 38 by a Lookup unit 44. So, the frame buffer address and other necessary information as described hereafter are extracted from Table 38 and supplied to Frame Processing Unit 36 before a frame can be appended to the preceding consecutive frames pertaining to the same flow in the assembled, data frame.

It must be noted that the lookup function can be implemented using a hashing mechanism having a unique value depending on the address field of the frame. This value allows to address a data field within Lookup unit 44 which contains the address of Table 38 where the corresponding flow is stored. When there is not yet an existing flow in Table 38, the hashing uses an address whose the data field contains the pointer to the new flow address field of Table 38. Other classical lookup mechanisms such as byte or bit comparison could be used. In fact, the complexity of the Lookup unit depends upon the number of lookups to perform and the number of bytes to compare.

An Assembly Processing unit 46 builds the assembled data frame by using the information contained in Frame Buffer 40. For this, all the data frames of a flow are read consecutively. At each address in Frame Buffer 40, the next field indicates where the next element is or if it is the last element. For each frame to be appended, Assembly Processing unit 46 builds the assembly header and stores it followed by the data of the frame in First In-First Out buffer 48 until all frames are processed. Then, the main Protocol Header is built and transmitted over the backbone, the contents of FIFO 48 being transmitted just after it.

Figure 4:
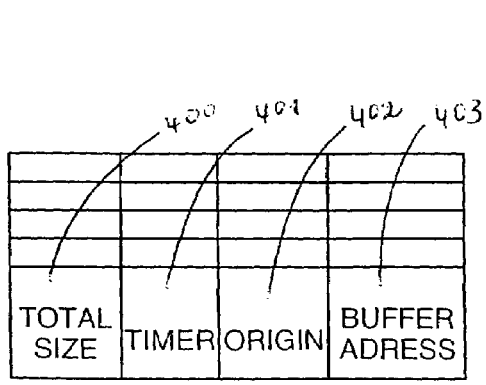
FIG. 4 is a schematic representation of the table used by the ingress node to identify a flow of data including a plurality of consecutive segmented frames to be assembled.

As illustrated in FIG. 4, each address location in Table 38 contains four fields. The first field is 'Total Size' (400). It is a variable value representing the total number of bytes each time a frame is appended in the assembled data frame. This total size is limited by the backbone MTU which depends upon the buffer size of the backbone nodes. Thus, this buffer size can be determined by the bit error rate. Generally, this backbone MTU has a length comprised between 2 k bytes and 8 k bytes.

The second field is 'Timer' (401). It is a time counter which is decremented from a predetermined value to zero. Such a predetermined value is required insofar as the time between two frames of a same flow is unknown and unpredictable. It would be possible that the time between the frames to be assembled be too important for the type of data in the flow. With such a timer, the time between the first frame and the last frame to be assembled may never overcome the predetermined time set in Table 38 at the beginning of the assembling process.

The third field is 'Origin' (402). It is the address of the first frame to be assembled which has been stored in Frame Buffer 40. This value is set when receiving the first frame and remains unchanged to be communicated to Assembly Processing unit 46 in order to know the location of the first frame in Frame Buffer 40.

The fourth field is 'Buffer Address'. It is the address of the next location in Frame Buffer 40 to store the contents of a new frame of a flow to be appended in the assembled frame. Therefore, this value is replaced with a new one by FREEL 42 each time a frame is identified.

Figure 5:
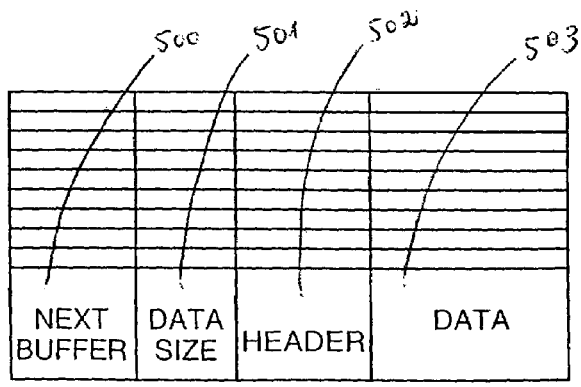
FIG. 5 is a schematic representation of the buffer storing the data of the consecutive segmented frames to be assembled.

As illustrated in FIG. 5, each address location in Frame Buffer 40 contains four fields. The first field is 'Next Buffer' (500). It is the address of the location wherein the next frame of the flow is to be stored. For each frame, the value of this field corresponds to the current value of Buffer Address in Table 38.

The second field is 'Data Size' (501). It is the size of the data field in the frame.

The third field is 'Header' (502). It is the location wherein the header of the frame is stored. Note that the size of the header is not required as the header is aligned on the right of the header field and all empty left fields are set to 0.

The fourth field is 'Data' (503). It is the location wherein the data of the frame is stored.

Figure 6:
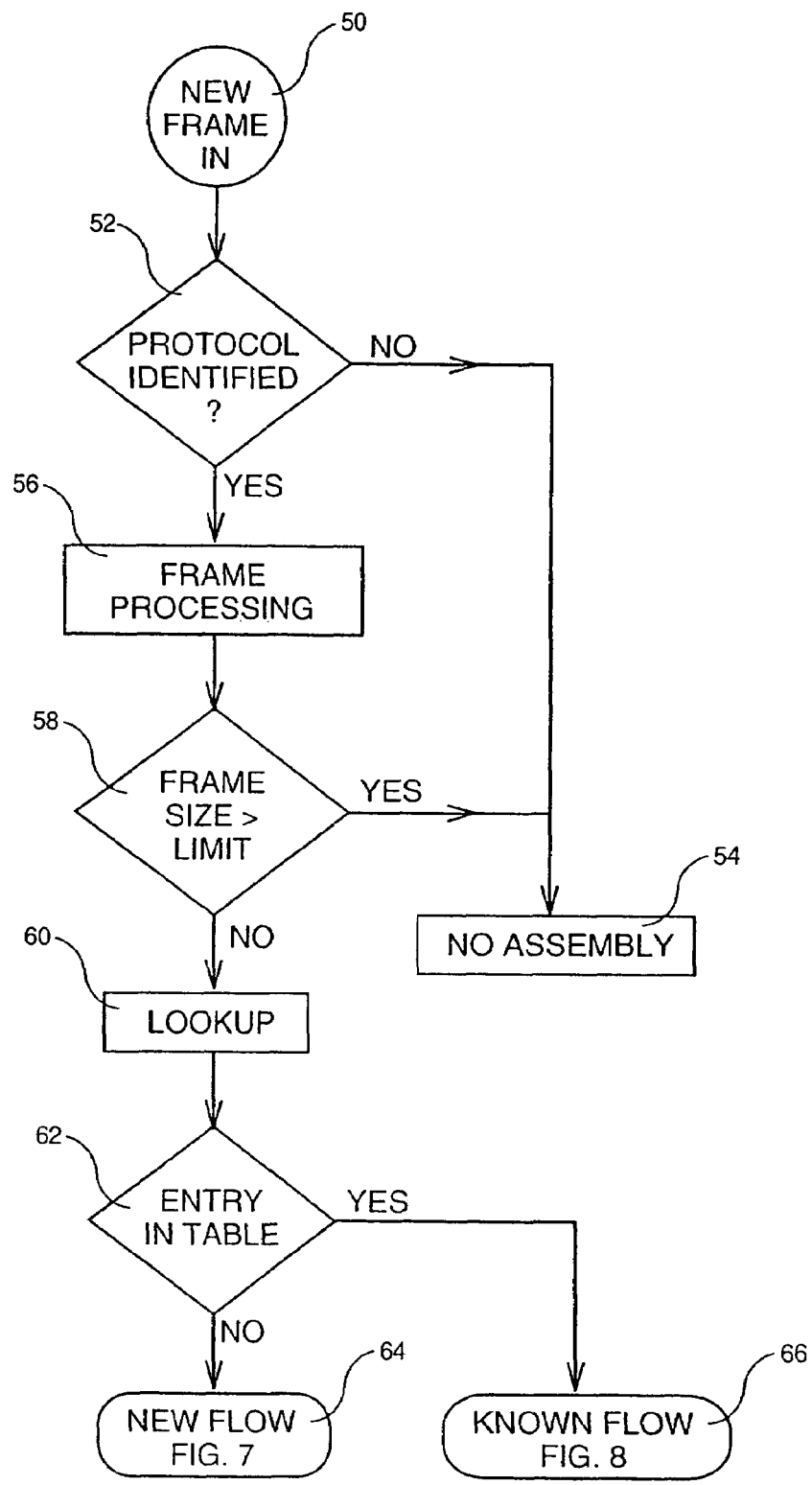
FIG. 6 is a flow chart of the processing steps used for the identification of a new frame by the ingress node.

The process used for the identification of a new frame by the ingress node is illustrated in FIG. 6. When a new frame is received (step 50) by the ingress node, its protocol is identified (step 52). Such an identification permits determining to know whether the frame belongs to a flow type which can be assembled. If there is no identification, the frame will not be assembled (step 54) and the process is ended. When there is identification, required protocol processing is done (step 56). Then a test is made (step 58) to check whether the size of the frame is greater than a predetermined limit corresponding to the MTU used in the backbone. If so, it is not worth assembling the frame and the process is ended to <<no assembly>> (step 54). If the frame size is less than this predetermined limit, the lookup function is performed (step 60). This function determines whether there is already an entry in Table 38 (step 62). Then the frame processing will be different according to whether it is a new flow (Step 64) or the flow is already known (step 66).

Figure 7:
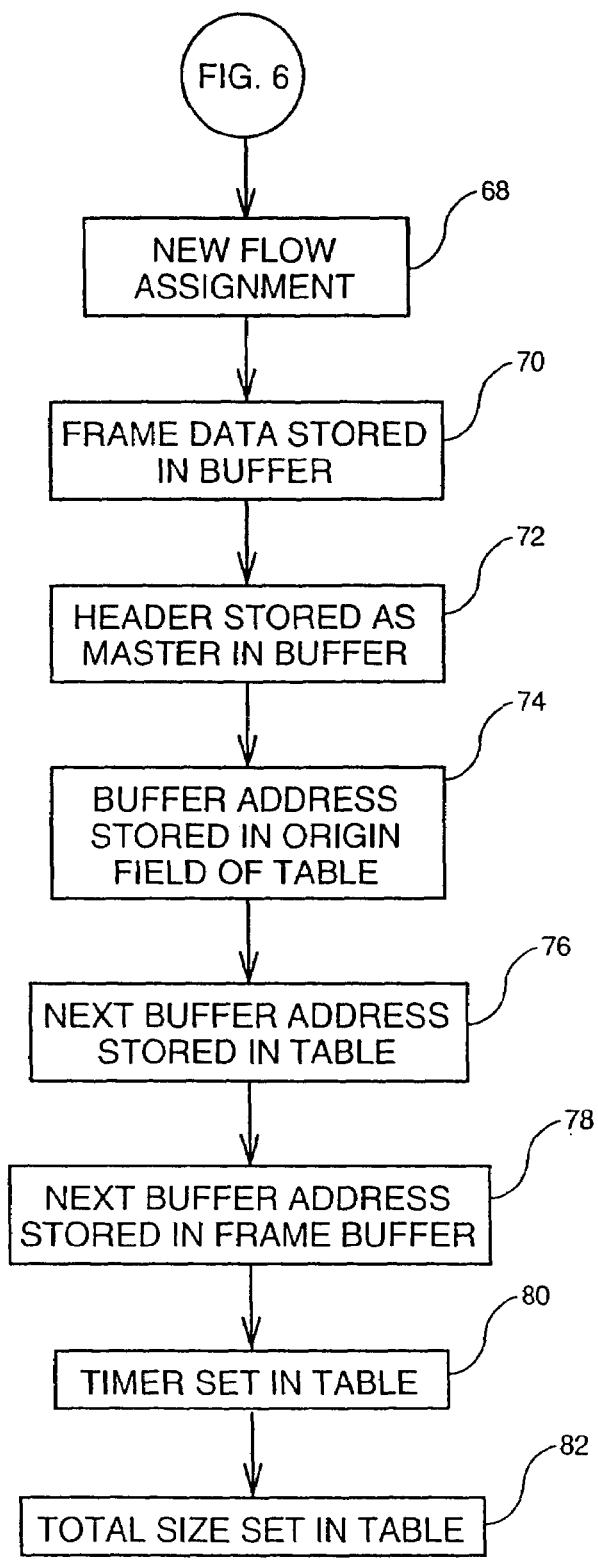
FIG. 7 is a flow chart of the processing steps used when the first frame of a new flow of data is to be processed by the ingress node.

If the lookup function has determined that the frame belongs to a new flow, the processing is according to the flow chart illustrated in FIG. 7

In reference to FIG. 7, when Lookup unit 44 does not find an existing flow, a new flow has to be assigned in Table 38 (step 68) so that the lookup function points to this flow each time a frame belonging to that flow is handled. Then, a buffer address in Frame Buffer 40 is determined by FREEL 42 so that the frame data can be stored in the buffer location corresponding to this address (step 70). The size of the data is put at the same buffer address in the data size field. Then, the header of the new frame corresponding to a master header is also stored in the buffer (step 72). As this frame is the first frame of a flow, the buffer address is stored in the origin field of Table 38 (step 74). For the next frame of the same flow, a new frame buffer address given by FREEL 42 is stored at the same time in the <<buffer address>> field of Table 38 (step 76) and in the <<next buffer>> field of the current frame buffer address (step 78). Such an operation is necessary to chain all the frames during the frame assembling.

Two additional steps are performed. First, the <<timer>> field of Table 38 is set (step 80) according to the information provided by Protocol Processing unit 34 as explained previously. Secondly, the <<total size>> field of Table 38 containing the length of the assembled frame during the assembling process is set to the length of the first frame (step 82).

Figure 8:
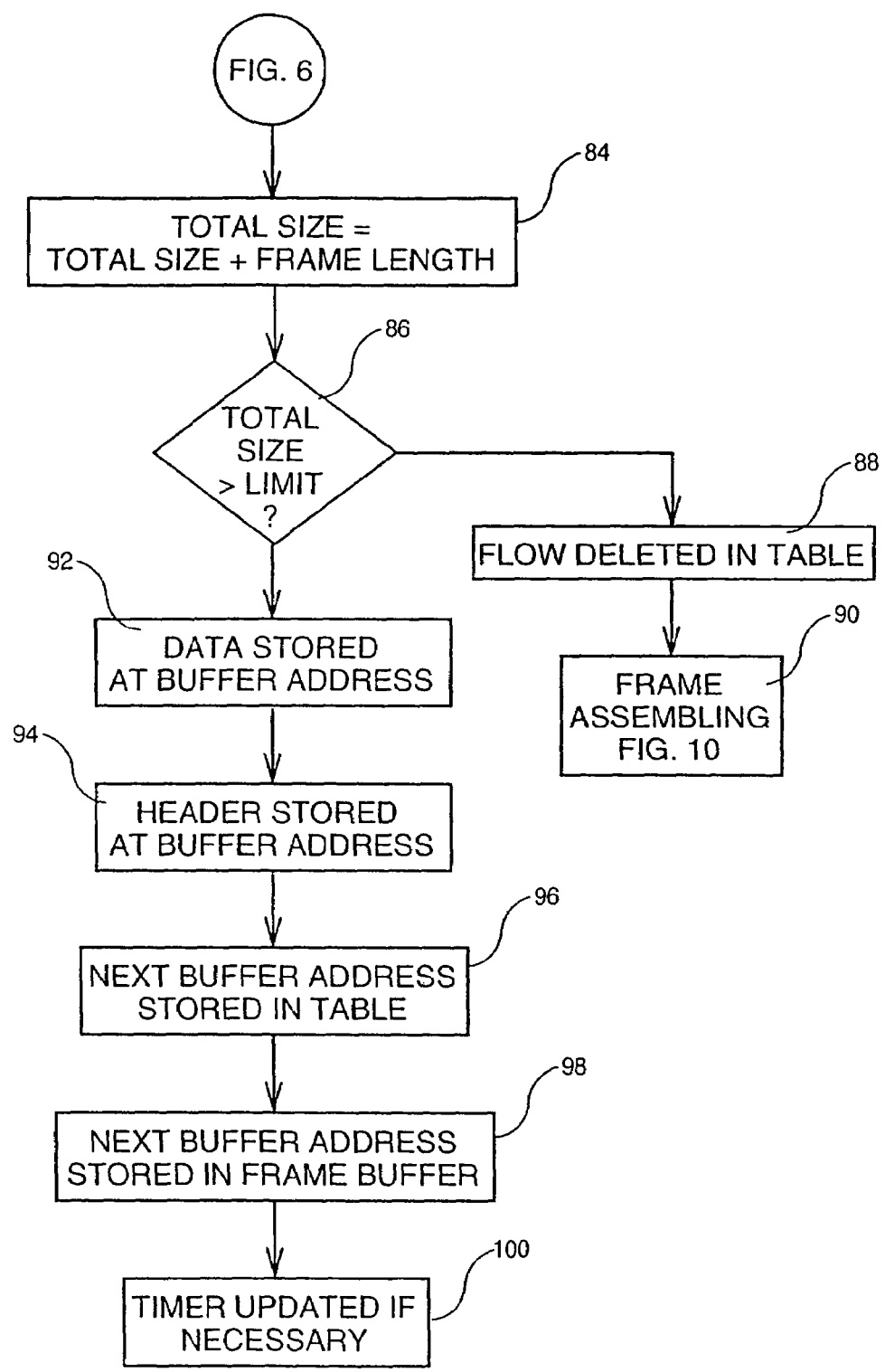
FIG. 8 is a flow chart of the processing steps used when the current frame to be processed by the ingress node belongs to a known flow.

Referring to step 66 of FIG. 6, the processing steps used when the frame received by the ingress node belongs to a known flow are represented by the flow chart of FIG. 8. First, the size of the frame is added to the value contained in the <<total size>> field of Table 38 (step 84) and a test is made (step 86) to check whether this total size is greater than a predetermined limit which is generally the MTU enabled by the backbone. Note that, inasmuch as the assembly headers included in the assembled frame are shorter than the protocol headers of the segmented frames, the size of the assembled frame is less than the total size of the assembled frame. Such an approximation enables transmission over the backbone of assembled frames the length of which is less than the authorized MTU. However, it would be possible to compute a <<total size>> corresponding to the exact length of the assembled data frame by taking the exact size of the assembly headers into account.

If the <<total size>> value is greater than the predetermined limit, meaning that the preceding total size is equal to or just below the limit, the current flow is deleted in Table 38 while the pointer value of Lookup unit 44 is also deleted (step 88). Then, the process goes to the assembly of the segmented frames by Assembly Processing unit 46 as described later (step 90).

If the total size value is less than the predetermined limit, the frame is stored at the buffer address given by the <<buffer address>> field of Table 38 (step 92) while the data size is stored in the data size field at this address. Then, a differential header with respect to the protocol header of the first frame is built and stored in the header field of the frame buffer (step 94). It must be noted that it is not necessary to store the length of this differential header since this one always includes a first byte different from 0.

At this point, the process of FIG. 8 is identical to the process of FIG. 7 when there is no existing flow. For the next frame of the same flow, a new frame buffer address given by FREEL 42 is stored at the same time in the <<buffer address>> field of Table 38 (step 96) and in the <<next buffer>> field of the current frame buffer address (step 98).

Finally, the last step of the process is to update the <<timer>> field of Table 38 (step 100) if necessary. This operation is required when the current frame timer is below the value of the <<timer>> field. Such an event does not occur very often insofar as all the frames of a flow have generally the same latency/jitter and priority settings.

Figure 9:
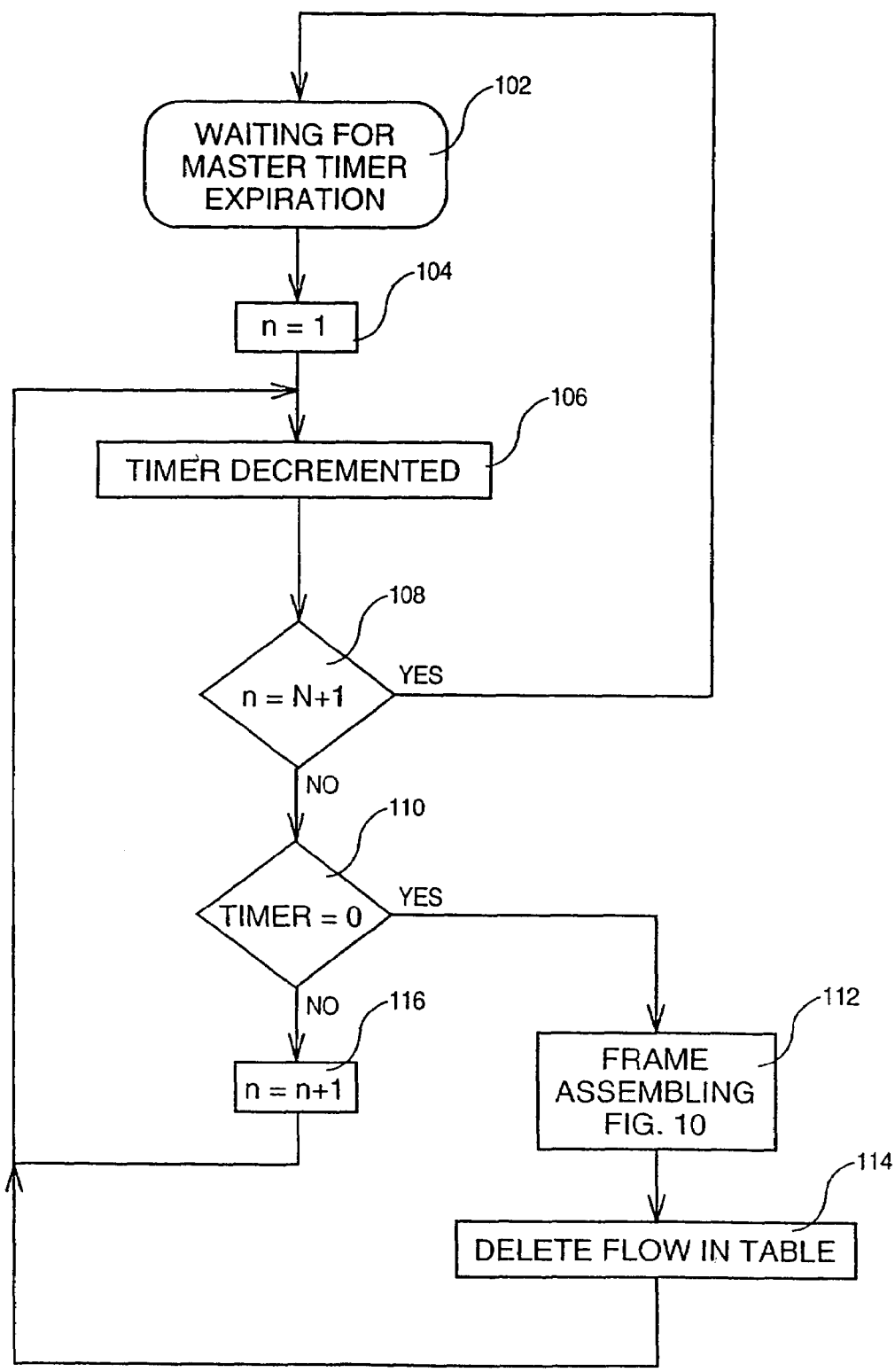
FIG. 9 is a flow chart representing the steps for processing the timer values of all existing flows in the ingress node.

It must be noted that the value of the <<timer>> fields of Table 38 are regularly decremented, according to the process represented in FIG. 9. The process starts when a master timer of the ingress node (either integrated in Frame Processing unit 36 or external) expires (step 102). Assuming that n flows are processed and identified in Table 38, a variable n is set to 1 (step 104). Note that there are several ways to have the list of existing flows, but the best way consists in scanning line by line the contents of Table 38. Only addresses with non-zero fields of <<total size>>, <<timer>> and <<origin>> are taken into account. Checking only either <<total size>> field or <<origin>> field is in fact necessary.

The timer value is decremented (step 106) on a regular basis, for example every m milliseconds with m being from 1 to 9. Then, a test is made (step 108) to check whether n has reached a value N+1 with N being the maximum number of flows in Table 38. If so, the process returns waiting for master timer expiration. If n is not greater than N, a test is made (step 110) to check whether the timer value is equal to 0. If so, this means that frame assembling may be started for flow n (step 112) as described hereafter. Then, the flow n is deleted in Table 38 (step 114). If the timer value is not yet equal to 0, variable n is incremented to n+1 (step 116) and the process loops to step 106 to perform processing of timer n+1.

Figure 10:
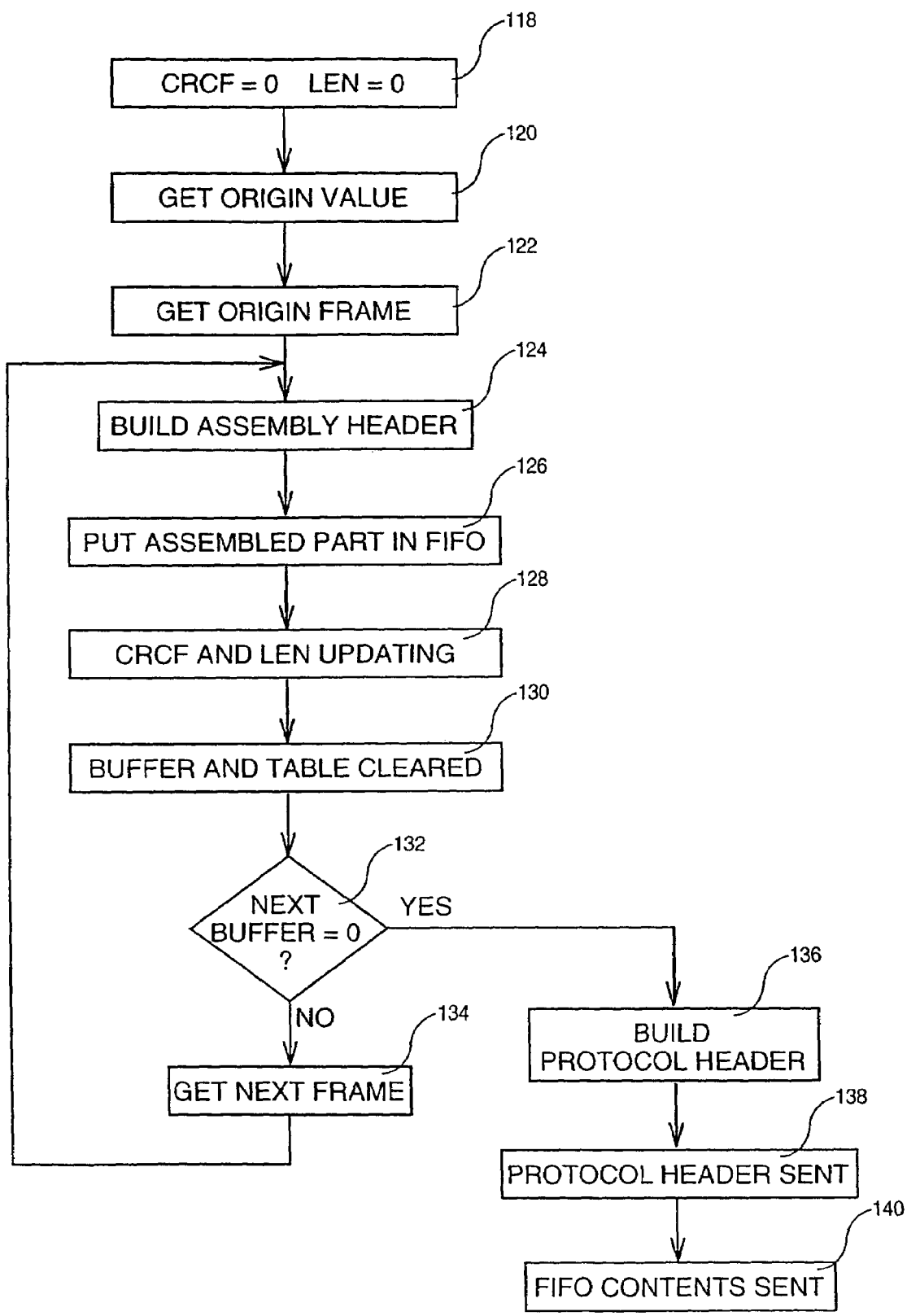
FIG. 10 is a flow chart representing the steps for assembling consecutive segmented frames into an assembled frame.

The frame assembling made by Assembly Processing unit 46 is now described in reference to FIG. 10. First, variables CRCF representing final checksum computed on the assembled frame and LEN representing the length of the assembled frame are initiated (step 118). Then, Assembly Processing unit 46 gets the value of the <<origin>> field in Table 38 (step 120). Assembly processing unit is able to perform the assembling using only the information from Frame Buffer 40 starting with the first frame addressed by the value of the <<origin>> field (122).

For each assembled part of the assembled frame corresponding to each frame, the first step consists in building the assembly header (step 124) which is generally simpler for the first frame since there is no differential Header. Once the assembly header has been built, the assembled part including the assembly header and the data is stored FIFO 48 (step 126). Then, variables CRCF and LEN are updated according to the data stored in FIFO 48 (step 128), and the contents of Frame Buffer 40 and Table 38 corresponding to the processed frame are cleared (step 130).

Then, a test is made to check whether there is a <<next buffer>> field different from zero (step 132). If it is the case, the next frame read from the frame buffer (step 134) and the loop comes back to the beginning of the assembling process (step 124).

When <<next buffer>> field in the frame buffer does not contain any address, this means that the frame which has just been processed is the last one. In such a case, the main protocol header of the assembled frame is built using the values of variables CRCF and LEN updated at each frame being processed (step 136). Then, the main protocol header is transmitted (step 138) followed by the contents of FIFO 48 (step 140) which contains all the assembled parts of the assembled frame.

Figure 11:
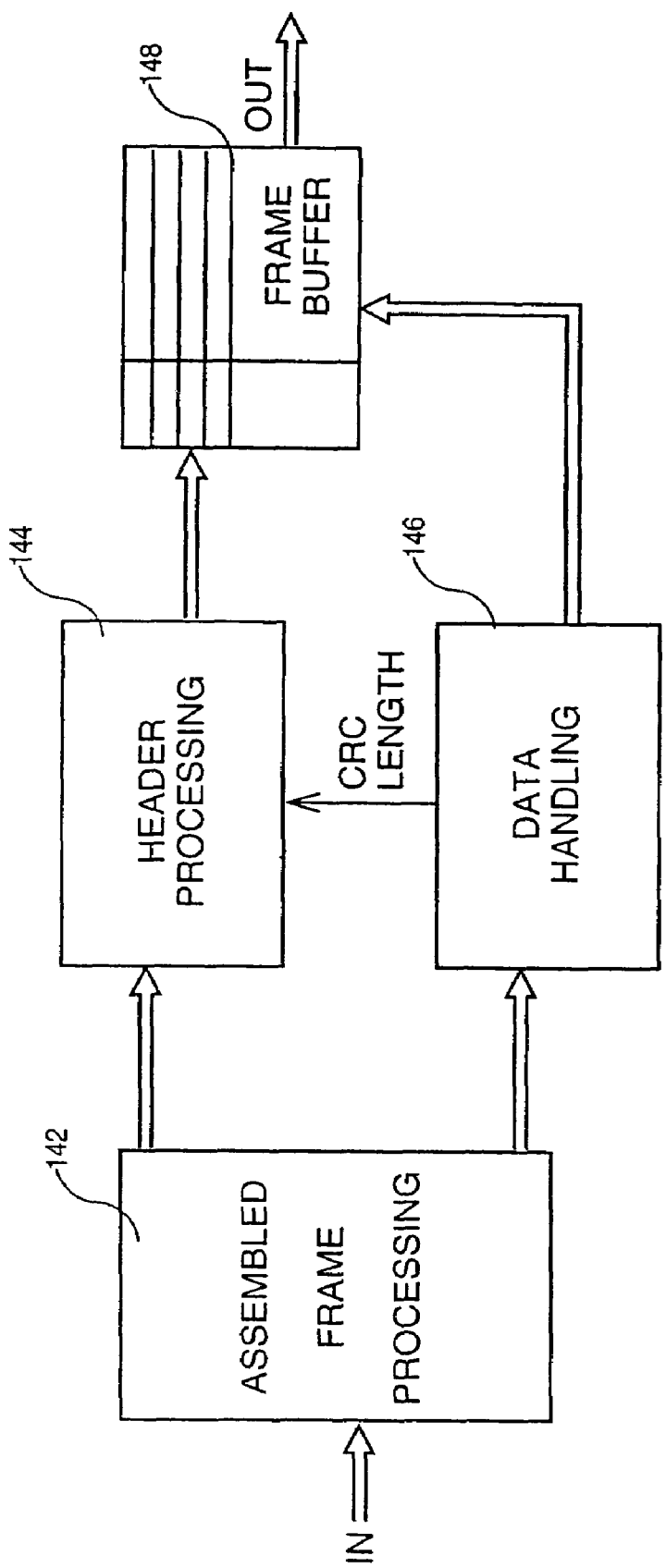
FIG. 11 is a block-diagram of the de-assembling mechanism of the egress node used to implement the method according to the invention.

When the assembled data frame is received by the egress node, it is de-assembled using a device represented in FIG. 11. First, the assembled data frame is received by Protocol Processing unit 142 wherein the protocol header is identified in order to recognize an assembled data frame and a split is performed between header and data fields. The main protocol header and the assembly headers are sent to Header Processing unit 144 whereas the data fields are sent to Data Handling unit 146. Each protocol header specific to a frame which has been re-built from the main protocol header of the assembled frame and the assembly header are stored in Frame Buffer 148 at an address defined by a pointer whereas the corresponding data are transferred from Data Handling unit 146 to frame buffer 148 in the same location as the protocol header. Note that the protocol header of each frame is re-built by Header Processing 144 by using the CRC and Length of the data field on line 150 from Data Handling unit 146.

Figure 12:
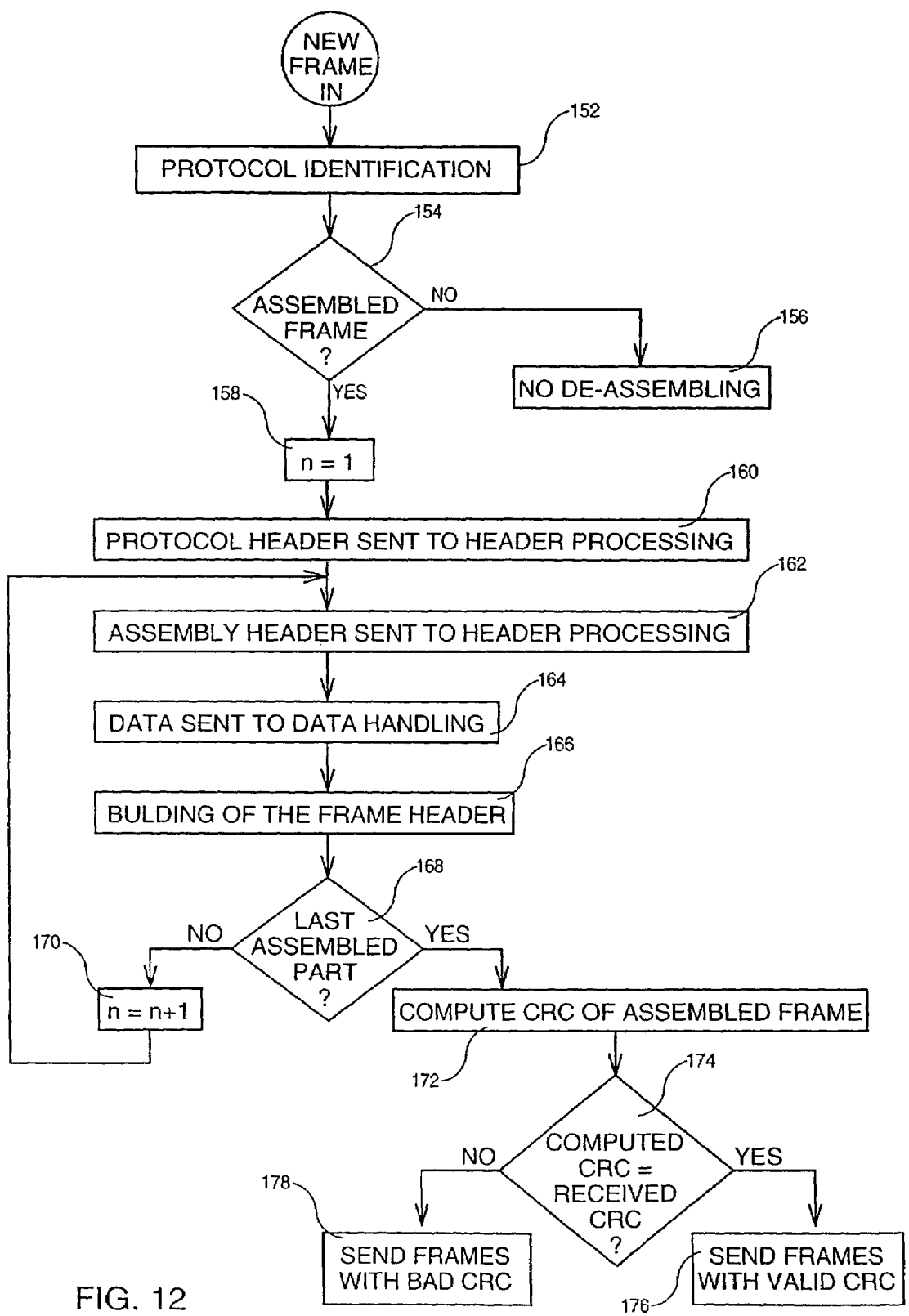
FIG. 12 is a flow chart of the processing steps used for de-assembling the assembled data frames received by the egress node.

In reference to FIG. 12, the process used in the egress node for de-assembling the assembled data frames is now described. When a new frame is received, the protocol is first identified (step 152) in order to determine whether the frame is an assembled data frame or not (step 154). If it is not an assembled frame, there is no de-assembling (step 156) and the frame is transmitted as such. If it is an assembled frame, a variable n is set to 1 (step 158), the protocol header of the assembled frame is transmitted to Header Processing unit 144 (step 160) and the first assembly header is also transmitted to Header Processing unit 144 (step 162) whereas the corresponding data are transmitted to Data Handling unit 146 (step 164).

Then, the protocol header of the frame is re-built (step 166) by Header Processing unit 144 using the CRC and the data length provided by Data Handling unit 146 and the differential header of the assembled part. After this, a test is made to check whether the assembled part which has been processed is the last one of the assembled frame (step 168). If not, variable n is incremented to n+1 (step 170) and the process loops to the processing of the next assembled part of the assembled frame (step 162).

If there is no more assembled part to be processed, a final CRC check is performed to validate the segmented frames before resending them. For this, the CRC of the assembled data frame is computed (step 172). The computed CRC is compared to the CRC value received in the assembled frame header (step 174). If the comparison is positive, there is no problem and the segmented frames are transmitted with their valid CRC (step 176). But, if the computed CRC is different from the received CRC, the frames are sent with a bad CRC (step 178). As a matter of fact, without adding a specific CRC or checksum field in each assembly header (as proposed optionally) corresponding to the CRC or checksum of the assembled frame, there is no method to know which frame is corrupted when a failure occurred in the assembled frame received by the egress node, either because one or several bits have been inverted, or because the CRC or checksum value of the frame has been changed. It must be noted that it is better to send the corrupted frame in order to ask for a retry to the sender than to abort the frame transmission as the communication timer may take more time to expire than the time to receive and process the corrupted frame.

While there have been described what are considered to be preferred embodiments of the present invention, variations and modifications in the preferred embodiments will occur to those skilled in the art once they are made aware of the invention. As just one example, the invention could readily be used with telephony connectors other than the standard RJ45 connector. Therefore, it is intended that the appended claims shall be construed to include not only the preferred embodiments but all such variations and modifications that fall within the true spirit and scope of the invention.

What is claimed is:

1. A data transmission system comprising:
   at least a backbone comprising an ingress node and an egress node, the backbone allowing high speed transmission of data and enabling long Maximum Transmission Units (MTU) between ingress node and egress node,
   a sending unit connected to the ingress node via a first access link and a receiving unit connected to the egress node via a second access link, the first and second access links being low speed access links requiring the data frames to be segmented into short MTUs between the sending unit and the ingress node and between the egress node and the receiving unit,
   assembling instrumentalities located in the ingress node to assemble a plurality of consecutive segmented data frames belonging to the same flow of data transmitted from the sending unit to the ingress node into an assembled data frame corresponding to one of the long MTUs.

2. A data transmission system according to claim 1, wherein the assembling instrumentalities comprise
   a storage unit storing a table wherein each entry is allocated to each flow of data and contains information on the flow of data, a frame buffer for storing each segmented frame of the plurality of frames, a list of pointers pointing to the free locations of the frame buffers and a FIFO for storing consecutive processed frame data for building the assembled frame data,
   a lookup unit for looking up the table to find the entry corresponding to a given frame or creating a new entry if necessary,
   a frame processing unit receiving the plurality of consecutive segmented data frames and, for each frame, requesting its corresponding data flow information to the lookup unit and storing frame data in the frame buffer using the list of pointers to find a free frame buffer entry, and
   an assembly processing unit reading all the data frames stored in the frame buffer by the frame processing for a given data flow, processing them, storing them in the FIFO and reading them to build and send the assembled data frame.

3. A data transmission system according to claim 2, wherein an entry in the table includes an <<original>> field pointing to the address of the location wherein is stored the first frame of the plurality of frames stored in the frame buffer and a <<buffer address>> field pointing to the address of the location in the frame buffer in which the current frame is to be stored.

4. A data transmission system according to claim 3, wherein the entry in the table includes a <<total size>> field storing the total size of the consecutive segmented frames of the same flow, the segmented frames being processed into the assembled data by the assembly processing unit associated with the FIFO as soon as the value of the <<total size>> field is equal or just below a predetermined limit.

5. A data transmission system according to claim 4, wherein the entry in the table further includes a <<timer>> field defining a time counter which is set to a predetermined value when the first frame of the plurality of frames is received by the ingress node and which is regularly decremented until zero, the step of assembling the assembled frame being performed if the predetermined value is reached before the total size has a value equal to or just below the predetermined limit.

6. A data transmission system according to claim 5, wherein each location of the frame buffer includes, further to the header and the data of the frame, a <<next buffer>> field defining the location in the frame buffer in which the next frame is to be stored and a <<data size>> field containing the size of the data of the stored frame.

7. A data transmission system according to claim 6, wherein the assembly processing unit builds a main protocol header for the assembled data frame and a plurality of assembled parts, each assembled part including a differential header with respect to the main protocol header and the data of the corresponding segmented frame, the assembled parts being serially stored in the FIFO and the assembled parts preceded by the main protocol header being serially transmitted over the backbone when the last assembled part of the assembled frame has been stored in the FIFO.

8. A data transmission system according to claim 7, further comprising protocol processing instrumentalities for identifying the protocol of the frame received by the ingress node and processing the frame if necessary before performing the assembly of the frame only if the protocol of the frame is identified.

9. A data transmission system according to claim 8, wherein the egress node comprises de-assembling instrumentalities comprising assembled frame processing for identifying the protocol of the frame received by the egress node, a header processing unit for building the protocol header of each segmented data frame to be transmitted from the egress node to the receiving unit, a data handling unit for segmenting the data of the assembled data frame into the data fields of the segmented frames and a frame buffer for storing each re-built segmented frame before transmitting it to the receiving unit.

10. A data transmission system according to claim 2, wherein the assembly processing unit comprises building instrumentalities to build a main protocol header for the assembled data frame and a plurality of assembled parts, each assembled part including a differential header with respect to the main protocol header and the data of the corresponding segmented frame, the assembled parts being serially stored in the FIFO and the assembled parts preceded by the main protocol header being serially transmitted over the backbone when the last assembled part of the assembled frame has been stored in the FIFO.

11. A data transmission system according to claim 9, wherein the assembly processing unit comprises building instrumentalities to build a main protocol header for the assembled data frame and a plurality of assembled parts, each assembled part including a differential header with respect to the main protocol header and the data of the corresponding segmented frame, the assembled parts being serially stored in the FIFO and the assembled parts preceded by the main protocol header being serially transmitted over the backbone when the last assembled part of the assembled frame has been stored in the FIFO.

12. A data transmission system according to claim 1, further comprising a protocol processing instrumentalities for identifying the protocol of the frame received by the ingress node and processing the frame if necessary before performing the assembly of the frame only if the protocol of the frame is identified.

13. A data transmission system according to claim 1, wherein the egress node comprises de-assembling instrumentalities comprising assembled frame processing for identifying the protocol of the frame received by the egress node, a header processing unit for building the protocol header of each segmented data frame to be transmitted from the egress node to the receiving unit, a data handling unit for segmenting the data of the assembled data frame into the data fields of the segmented frames and a frame buffer for storing each re-built segmented frame before transmitting it to the receiving unit.

* * * * *